Feb. 6, 1968  A. H. CHANT, JR., ETAL  3,367,589
FILM SELECTOR FOR PLASTIC FILM WRAPPING STATION
Filed Jan. 23, 1967  3 Sheets-Sheet 1

INVENTORS.
ALBERT H. CHANT, JR.
WILLIAM F. WILSON, JR.
BY
Paul + Paul
ATTORNEYS.

INVENTORS.
ALBERT H. CHANT, JR.
WILLIAM F. WILSON, JR.
BY
Paul + Paul
ATTORNEYS.

United States Patent Office 3,367,589
Patented Feb. 6, 1968

3,367,589
FILM SELECTOR FOR PLASTIC FILM
WRAPPING STATION
Albert H. Chant, Jr., Holland, and William F. Wilson,
Jr., St. David's, Pa., assignors to J. B. Dove & Sons,
Inc., Bristol, Pa., a corporation of Pennsylvania
Filed Jan. 23, 1967, Ser. No. 611,161
6 Claims. (Cl. 242—55.3)

This invention relates to a packaging operation, and in particular to a wrapping machine which may be used to advantage in the manual operation of wrapping food products, particularly meat products, in a supermarket.

As is well known, it is customary in supermarkets to place cuts of meats, such as lamb chops, pork chops, sirloin steaks, porterhouse steaks, ham steaks, chicken parts, ground meats, etc., on a supporting tray or base of paperboard, or plastic or other material, and to wrap the supported meat product in transparent plastic film for display and sale in the freezer compartments of the store. The wrapping of such meat products is referred to in the trade as tray wrapping. Larger and/or irregular shaped cuts of meat, such as roasts, whole or half chickens, turkeys, etc., may merely be wrapped in the transparent plastic film without use of a supporting tray or board. Such wrapping is referred to in the trade as sheeting.

In tray wrapping, some products require a larger size of tray than others, and these consequently require a wider width of plastic wrapping film. For economy of use of film, it is desirable to have available for the warppers use, rolls of film of different widths. Ordinarily, three different widths are used—narrow, medium and wide.

For sheeting of the larger or irregular cuts, a fourth roll of film is desirably made available.

The purpose of the present invention is to provide a machine useful in wrapping manually food products, particularly meat products, in any one of a plurality of widths of plastic film, according to the size of the individual item to be wrapped. In the machine of the present invention, the operator simply shifts a selection lever to a desired position to make available to him a different width or type of wrapping film.

A further purpose is to provide a wrapping machine as aforesaid having a film selection mechanism adapted to select either a narrow, wide, or medium film, and which does not require threading of the film each time a different width is to be used.

Another purpose is to provide a film selector type of wrapping station, as above, which includes a fourth roll of film which is used for sheeting and which is in addition to the three widths of film referred to above. The fourth roll of film is readily available for use by the operator in the wrapping of roasts or other large or irregular sized products without disturbing the availability to the operator of the three separate widths of film used in tray wrapping.

These and other purposes, objects and advantages of the present invention will be clear from the description which follows of a presently preferred form of machine embodying the invention and illustrated in the drawings in which.

Figure 1:
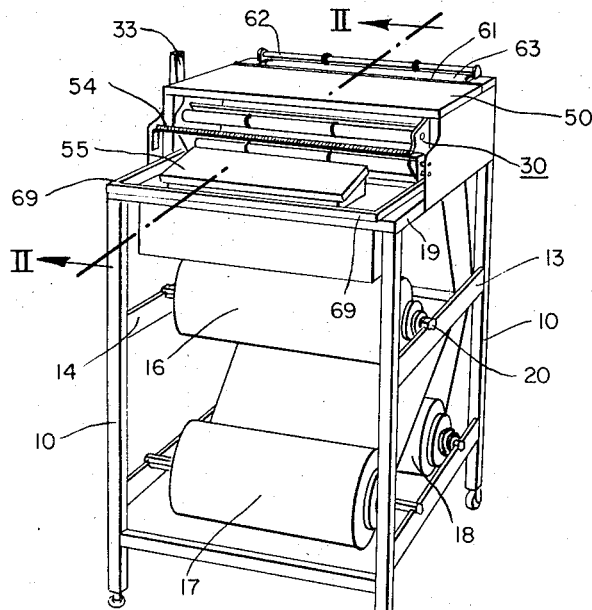
FIG. 1 is a diagrammatic perspective illustration of a wrapping station of the console type incorporating a film selector mechanism of the present invention.

Referring now to FIG. 1, there is shown a diagrammatic perspective illustration of a stand or console which carries four separate rolls of transparent plastic wrapping film. Only three rolls 16, 17 and 18 are visible in FIG. 1 but a fourth roll 15 is clearly visible in the side elevational view of FIG. 2.

Figure 2:
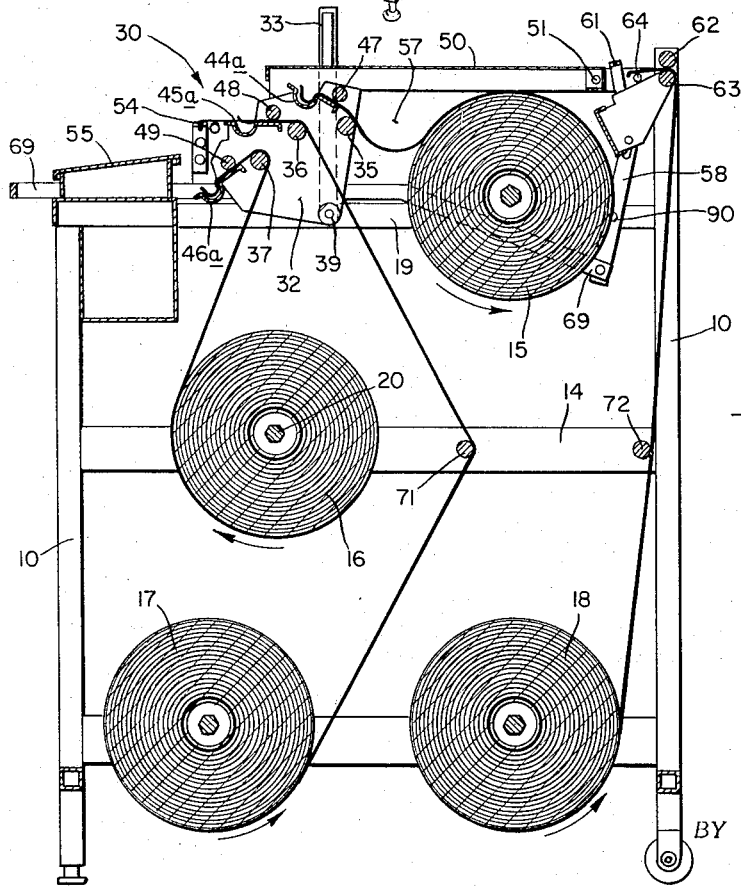
FIG. 2 is a diagrammatic elevational view in section along the line II—II in FIG. 1 looking in the direction of the arrows, showing the film selector mechanism.

For purposes of the present description, it will be assumed that the uppermost roll 15 in FIG. 2 is a roll of narrow width, that the next roll 16 is a roll of wide width, that the front roll 17 is a roll of medium width, and that the rear lower roll 18 is the sheeting roll.

So far as the present invention is concerned, the stand or console may be of any suitable construction. It includes a top plate 50 which functions as the wrapping surface. Forward of and below the top plate 50 is a hot wire cutoff 54 which is used to cut or sever the film transversely. In front of and below the hot wire cutoff 54 is a hot plate 55, preferably having a Teflon surface. Hot plate 55 is used for heat sealing the package. Mounted rearwardly of the top plate or wrapping surface 50 is a rear hot cutoff wire 61. This wire is used for severing the film of the sheeting roll 18.

The purpose of the film selector mechanism provided by the present invention, and identified comprehensively in the drawing by the reference numeral 30, is to make readily available to the operator, without loss of film or time, the film of any one of the three rolls 15, 16 and 17 of different widths of film. This is accomplished, in accordance with the present invention, by providing a selector mechanism in which the operator by merely moving selector lever 33 brings into position for ready pickup the outer end of any one of the three rolls of film, 15, 16 and 17, thereby giving the operator the choice of a narrow, wide or medium width roll. The sheeting roll 18 is not threaded through the selector mechanism 30, but is available to the operator at the upper rearward end of the console, just in back of the top plate of wrapping surface 50.

Figure 3:
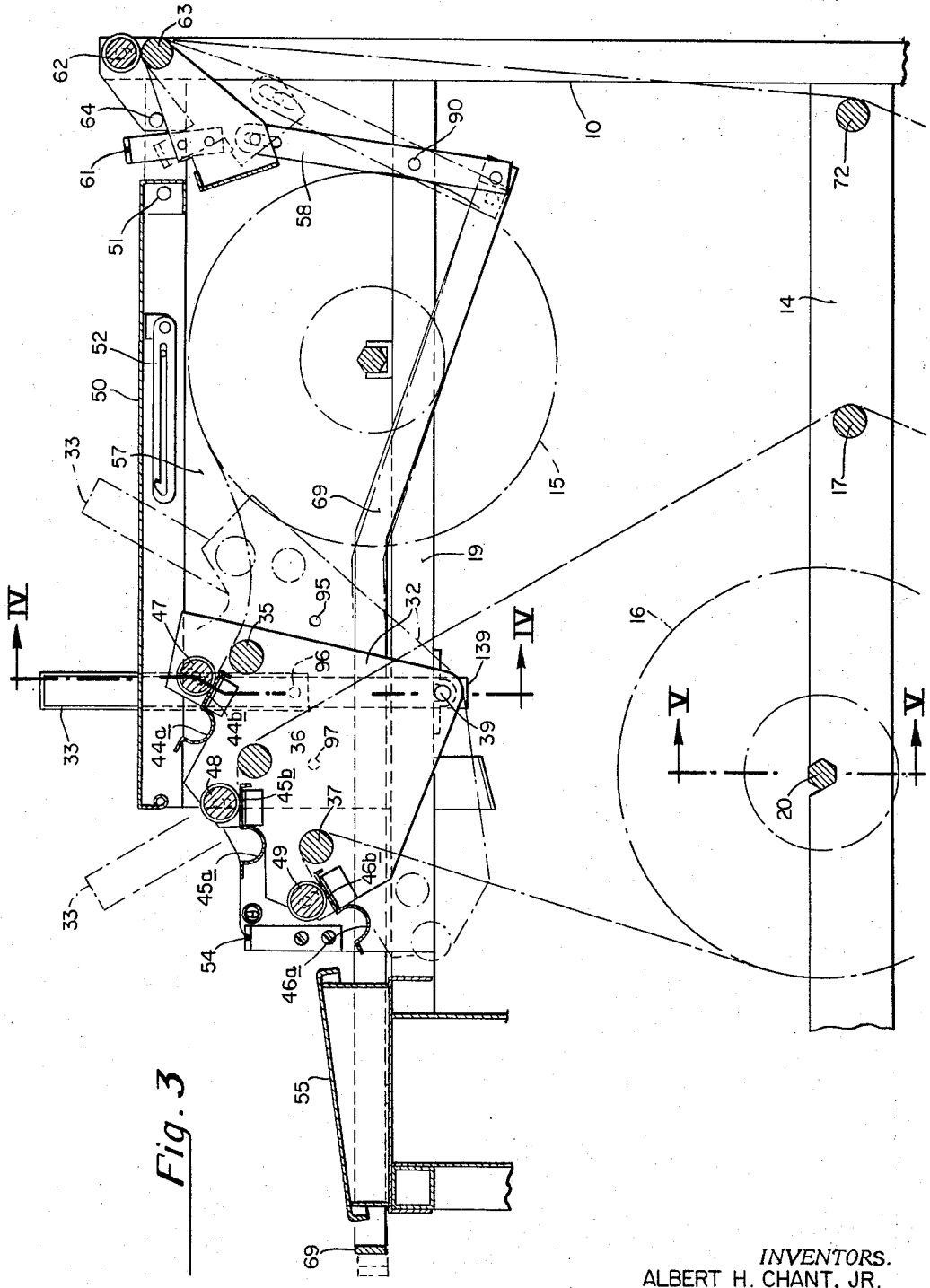
FIG. 3 is an enlarged diagrammatic illustration of the selector mechanism.

As seen best in FIGS. 2 and 3, the selector mechanism 30 includes three sets of similar means for holding the ends of the three films of different widths. Each set includes a guide roll, a pressure roll, and a combined pick-up well and support shelf. The guide rolls are identified by the reference numerals 35, 36 and 37. The pressure rolls are identified by the numerals 47, 48 and 49. The combined pick-up wells and support shelves are integral pieces and are identified by the reference numerals 44, 45, and 46, using in the drawings an *a* suffix to denote the pick-up well portion and a *b* suffix to denote the support shelf.

In FIGS. 2 and 3, the narrow width roll 15 is shown threaded over guide roll 35 and between the pressure roll 47 and support shelf 44b. The medium width roll 17 is threaded over guide roll 36 between pressure roll 48 and support shelf 45b. The wide roll of film 16 is threaded over guide roll 37 and between pressure roll 49 and support shelf 46b. In each case, the end or near end portion of the film falls into the pick-up well, 44a, 45a, or 46a. An additional guide bar 71 is provided for the film of roll 17. This guide bar 71 is mounted below the selector mechanism.

The sheeting film from roll 18 is threaded in back of a guide bar 72 and then up to and between rolls 62, 63, with the end of the sheeting film resting on a rod 64 just rearward of the rear hot wire cutoff 61.

The selector mechanism 30 may, within the limits of the invention claimed herein, take any one of several different forms so far as the structural details are concerned. The particular structure illustrated in the drawings will now be described in detail but variations thereof may be used without departing from the invention claimed.

Figure 4:
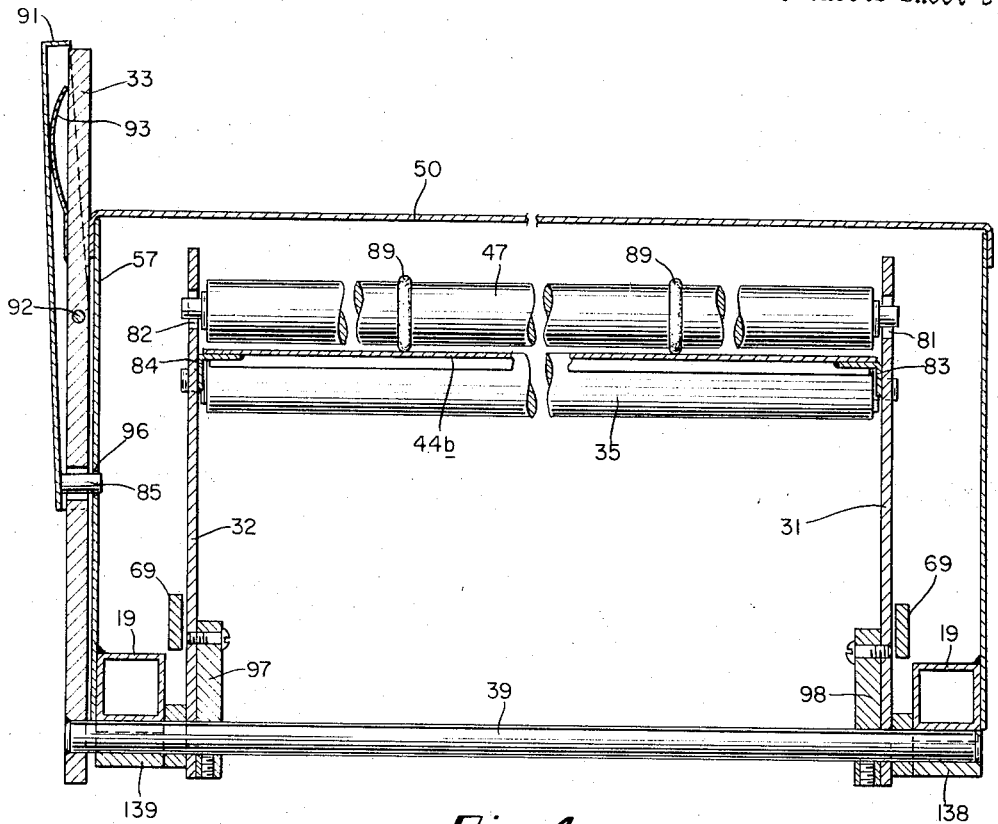
FIG. 4 is a view looking toward the rear of the machine along the line IV—IV of FIG. 3 showing the film selector lever and the film selector holding means.

In the drawing, the four legs 10 of the generally rectangular frame of the console are shown to support at or near their upper ends an open rectangular frame 19 of tubular cross-section. Secured to the under-surface of frame 19, one at each side thereof, are the brackets 138 and 139, seen most clearly in FIGS. 3 and 4. Supported by the brackets 138 and 139 is a pivotal rod 39 which extends from one side of frame 119 to the other. Welded to rod 39 at each side, or by set screws, and extending upwardly therefrom inside the frame 19 are support plates 97 and 98, and secured to support plates 97 and 98, as by bolts, are side plates 31 and 32 of generally triangular configuration, with the rod 39 passing through the lower corner portion of the side plates. Each of the side plates 31 and 32 is provided, near its upper edge with three radially disposed slots, for supporting the shafts of the pressure rollers 47, 48 and 49, while allowing limited vertical movement thereof. One such pair of slots, identified as 81 and 82, is seen in FIG. 4. Mounted on the side plates 31 and 32, below the slots, are three pairs of brackets for supporting therebetween the integral pick-up wells and supporting shelves. One such pair of brackets, identified as 83 and 84, are seen in FIG. 4. Also supported between the pick-up plates 31 and 32, below and rearwardly of the pressure rolls, are the guide rolls. Guide roll 35 is seen in FIG. 4.

In FIGS. 2 and 3, the selector mechanism is shown as being in that position which brings pick-up well 45a and hence the end of the medium width film from roll 17 to the wrapping position for ready pickup by the operator. By moving the selector mechanism pivotally on the pivot rod 39, in a clockwise direction as viewed in FIGS. 2 and 3, pickup well 46a and the wide film from roll 16 may be moved into wrapping position. Or, by moving the selector mechanism pivotally in a counter-clockwise direction, pickup well 44a and the narrow film from roll 15 may be moved into the wrapping position.

FIGURE 4 illustrates one convenient lever mechanism for moving the selector mechanism. In FIGURE 4, a lever 33 is shown to be fixed at its lower end to the outer end of the pivot rod 39. Three indexing holes, 95, 96 and 97 are provided in side plate 57 of the console in three different angular locations, as indicated in FIG. 3. A channel member 91 is pivotably secured to lever 33 by a pivot pin 92, as shown in FIG. 4. Secured to the lower end of channel member 91 is an index pin 85 which is adapted to enter into one of the index holes 95, 96 or 97, according to the angular position of the lever 33. A leaf spring 93 normally keeps the upper end of channel member 91 outward, away from lever 33, so that the index pin 85 at the lower end of the member 91 is normally pressed into one of the index holes. To change the position of the selector mechanism, the operator merely compresses the member 91 against the upper end of the selection lever 33 to withdraw the index pin 85 from whichever index hole it happens to be in, and then moves the lever 33 pivotably about the pivot rod 39, thereby pivotably moving the support plates 97 and 98, and thereby pivotably moving the side plates 32 and 31 and the entire selector mechanism to bring the desired pickup well and the desired width of film into operating position. The operator then grasps the end of the film with both hands and pulls it forward and upward, and then rearwardly over and about the tray to be wrapped on the wrapping surface 50. After wrapping the tray, the package is moved forwardly and downwardly, and the film is severed by the hot wire cutoff 54. The package is then heat sealed on the hot plate 55. If desired, the film may, of course, be severed by the hot wire cutoff 54 before wrapping the tray.

In accordance with the present invention, the end of each of three films is retained in one of the pick-up wells by squeezing the film end between a pressure roll, such as roll 47 or 48 or 49, and the support shelf portion of the pick-up wells. The pressure rolls, in the preferred form shown in the drawings, are gravity weighted; they are not spring loaded. The mere weight of the roll is employed to retain the film end in place. Preferably, the pressure rolls are provided with spaced-apart pressure rings of resilient material, such as are illustrated in FIG. 4 and identified by the reference numeral 89.

To avoid any downward pull on the film greater than that due to the weight of the film between the selector mechanism and the supply roll, and thereby to make it possible for a lesser amount of pressure to retain the end of the film in the pick-up wells, the shafts on which the supply rolls of film are mounted are provided with brake means for restraining free rotation of the roll shafts while allowing rotation thereof in response to the pull on the end of the film by the operator. A suitable form of braking means for the roll shafts is illustrated in FIG. 5.

Figure 5:
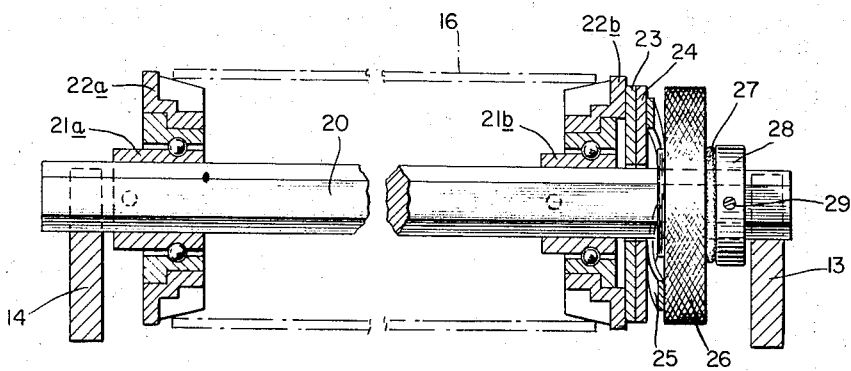
FIG. 5 is a view along the line V—V of FIG. 3 showing one of the core shafts, and showing the braking mechanism which allows restrained rotation of the film roll.

In FIG. 5, the roll shaft 20 is shown as having a hexagonal cross section, the particular shaft shown being that which supports the wide film roll 16. The ends of shaft 20 are supported in slots in the side brackets 13 and 14. Near each end of shaft 20 is a ball bearing assembly, 21a and 21b. Each ball bearing assembly supports a wedge-shaped adapter 22a and 22b which in turn support the core of the roll of film 16. At one end, the right end as viewed in FIG. 5, the adapter 22b extends outwardly beyond the bearing assembly 21b. Adjacent adapter 22b is a brake plate 23, and adjacent brake plate 23 is a pressure plate 24. Pressure plate 24 has a center aperture of hexagonal, or truncated circular, or other such shape that it is not rotatable relative to shaft 20. Next to pressure plate 24 is a member, such as a wavy washer 25, which allows a circular uniform pressure, and pressing against wavy washer 25 is an adjusting knob 26 internally threaded and adjustably rotatable on an externally threaded locking collar 28 the head portion of which is separated from the knob 26 by a ring 27 of resilient material. A set screw 29 is employed to hold collar 28 fixed on shaft 20. It will be seen that the core adapters 22a and 22b are wedged into the core of the film roll 16 and that the film roll 16 is free to rotate only to the extent that the adapters 22a and 22b are free to rotate. It will also be seen that the freedom of rotation of adapter 22b is determined and controlled by the degree of frictional engagement of the adapter 22b by the brake plate 23, which in turn is controlled by the pressure plate 24 and the degree to which the wavy washer 25 presses the pressure plate 24 against the brake plate 23. By rotating the knob 26 on the collar 28, the pressure exerted by the wavy washer 25 on the pressure plate 24 may be increased or decreased. Preferably, the knob 26 is so adjusted that the operator may pull film from the supply roll by a modest amount of force but the supply roll will stop rotating as soon as the pull is terminated.

Referring again to FIG. 2, it will be seen that, since the supply rolls of film are stabilized against rotational movement due, for example, to unbalance, the gravity pressure rolls 47, 48 and 49 at the selector mechanism need apply only sufficient pressure to hold the weight of the length of film which extends from the selector mechanism to the supply roll. This, of course, is a very small weight.

It will also be seen that when the selector mechanism is rotated counter-clockwise to place well 44a in the operating position (occupied in FIG. 2 by well 45a) the length of film from the selector mechanism to the supply roll 15 will become taut. The other two ends of film, beyond the guide rolls 36 and 37, will merely be turned downward to a greater extent, as the selector mechanism is pivoted. Rotation of the selector mechanism in the opposite or clockwise direction will put slack in the length of film extending downward to the supply roll 17.

It will be seen then that, for tray wrapping, the operator has a choice of three widths of film (or of three different types of film) and that he may select any one of them by merely placing the lever 33 in the proper position. When he does so, the end of the film which he wants is moved into position. There is no threading, no fumbling for the wanted film, no wrinkling, no wasting of film.

The two front mounted rolls 16 and 17 are readily put in place from the front of the console. The top roll 15 is loaded by lifting the top plate 50, which is hinged at the rear at 51. Any suitable mechanism, such as a rotating link type bracket, or a slide bracket such as at 52, may be used to hold the plate 50 in the raised position.

The large roll 18 for sheeting may be mounted from the rear of the console. As indicated previously, the film from sheeting roll 18 is fed to the rear of the top of the console where its end is held between pressure roll 62 and guide roll 63. When the operator wants to wrap, for example, a roast, he reaches forward and pulls the sheeting film forward until he has the length he wants. Then he pushes the push bar 69 rearwardly to move the lever arm 58 pivotally about pivot 90 to raise the rear hot wire cutoff 61 to sever the film.

In summary, it will be seen that the present invention relates to a wrapping station in which a plurality of supply rolls of wrapping film are mounted. The invention provides a selector mechanism for presenting selected ones of said film to the wrapping position. The selector mechanism includes a plurality of squeeze means, one for each different film to be selected, for squeezing and holding the end of the film. The plurality of squeeze means are mounted on a common support which is movable, preferably pivotally, as by a lever arm, to place a selected one of the squeeze means, and hence a selected one of the film ends, at the wrapping position.

While the preferred embodiment of this invention has been described in some detail, it will be obvious to one skilled in the art that various modifications may be made without departing from the invention as hereinafter claimed.

What is claimed is:

1. In a wrapping station having a wrapping position; means supporting at fixed axial positions a plurality of rotatable supply rolls of plastic film of different widths or other different characteristics; and a selector mechanism for presenting selected ones of said film to the wrapping position in any sequence as desired, said selector mechanism comprising: a plurality of squeeze assemblies for squeezing and holding a plurality of ends of film at spaced apart positions, there being a different squeeze assembly for each different end of film to be presented to the wrapping position; common support means for supporting said plurality of squeeze assemblies near the forward end of the wrapping position; and lever means secured to said common support means for moving said squeeze assemblies as a unit to carry the end of a selected one of said films to the wrapping position and to carry the end of a nonselected film away from the wrapping position while maintaining said supply rolls at their respective fixed axial positions.

2. Apparatus as claimed in claim 1 characterized in that said common support means are mounted for pivotal movement about a pivot axis, and in that said squeeze assemblies are angularly disposed in said common support means relative to said pivot axis and adapted to move along arcuate paths about said pivot axis.

3. Apparatus as claimed in claim 2 further characterized in that each of said squeeze assemblies includes a support shelf over which the film is passed and a pressure roller mounted above said support shelf and adapted to press down on the film passing over said support shelf.

4. Apparatus as claimed in claim 3 further characterized in that a pickup well is provided forward of said support shelf for receiving the end of the film.

5. Apparatus as claimed in claim 4 further characterized in that said pressure rolls are gravity rolls, and are provided with peripheral bands of resilient material.

6. Apparatus as claimed in claim 5 further characterized in that said means supporting said supply rolls includes, for each roll, a shaft supported in said station, and in that friction brake means are provided for each shaft for preventing free rotation of said supply rolls while allowing restrained rotation of said rolls in response to the pull exerted by the station operator.

References Cited

UNITED STATES PATENTS 3,160,047   12/1964   Malloy et al. _____ 242—55.3 X

LEONARD D. CHRISTIAN, *Primary Examiner.*

Disclaimer 3,367,589.—*Albert H. Chant, Jr.*, Holland, and *William F. Wilson, Jr.*, St. David's, Pa. FILM SELECTOR FOR PLASTIC FILM WRAPPING STATION. Patent dated Feb. 6, 1968. Disclaimer filed May 23, 1969, by the inventors; the assignee, *J. B. Dove, Inc.*, consenting.

Hereby enters this disclaimer to claims 1, 2 and 3 of said patent.

[*Official Gazette April 7, 1970.*]